March 11, 1930.  J. A. TALLENT  1,750,497
ICE CREAM CONE MAKING MACHINE
Filed March 14, 1925   5 Sheets-Sheet 3

March 11, 1930. J. A. TALLENT 1,750,497
ICE CREAM CONE MAKING MACHINE
Filed March 14, 1925   5 Sheets-Sheet 4

Patented Mar. 11, 1930

1,750,497

UNITED STATES PATENT OFFICE

JOSEPH ANDREW TALLENT, OF ALTON PARK, TENNESSEE, ASSIGNOR OF THIRTY PER CENT TO DAVID THOMAS JONES AND THIRTY PER CENT TO JAMES ULYSSES JONES, BOTH OF CHATTANOOGA, TENNESSEE

ICE-CREAM-CONE-MAKING MACHINE

Application filed March 14, 1925. Serial No. 15,487.

My invention relates to new and useful improvements in pastry making machines and more particularly to a machine for making ice cream cones, the principal object of the invention residing in the provision of a machine adapted for baking a single or a plurality of cones at the same time, the machine shown in the drawings illustrating a construction whereby two cones may be baked simultaneously.

Another object of the invention resides in the provision of a machine of the character described having a stationary mold into which the batter is to be delivered and a movable core, the core being moved away from the mold to allow the introduction of the batter or the removal of the baked cone and moved into the mold, after the introduction of the batter, to spread the same in the mold into cone shape and to act as one of the baking elements.

Still another object resides in the provision of means, when the core is moved from the mold, for positioning the same to allow for movement of the batter discharging valve into position over the mold, the said valve being movable towards or from the mold and so timed as to be positioned over the mold, when the core is raised, to discharge batter into the mold and positioned away from the mold during the baking operation, the valve being so constructed as to deliver a predetermined amount of batter into the mold upon each operation thereof.

A further object of the invention consists in forming the molds in sections, one movable relative to the other, means being provided for normally holding and locking the sections together and means also being provided for unlocking the sections, when the cone has been baked and is to be removed, and to move one section relative to the other so that the cone may be easily taken therefrom.

A still further object resides in the provision of means for electrically heating both the mold and core for baking the cones and to allow a slight movement of the core relative to the mold, when the baking is begun, so as to allow for the escape of steam.

As another object of the invention I provide a novel form of receptacle for containing the batter and delivering the same through the valve into the mold, and the provision of means whereby the operation of the machine is controlled from a single drive shaft.

With the above and other objects in view, which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

The ice cream cone industry has grown, in recent years to considerable proportions and it can readily be appreciated that in making ice cream cones means must be provided whereby they can be cheaply and quickly made in order to allow for profit to the manufacturer. With my improved form of machine the same may be operated at small labor cost and cones so rapidly made as to allow the turn-out of a sufficient quantity in a day to make the same profitable.

Figure 8:
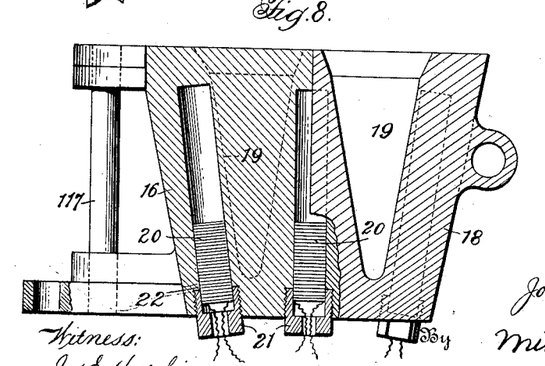
Fig. 8 is a longitudinal vertical section through one of the mold units with parts shown in elevation.
Figure 9:
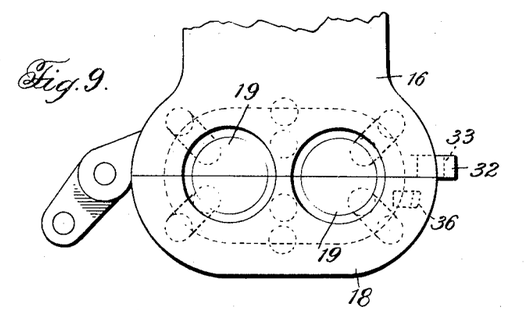
Fig. 9 is a top plan of one of the mold units.

In the drawings the numerals 1 indicate the side supporting frames of the machine which are connected at the top by the table or plate 2, said table or plate being secured to the side frames by means of the bolts 3 or other suitable connecting means. Secured to the side frames 1, beneath the plate or table 2, by means of the bolts 4 or other suitable fastenings is the cross bar 5 and secured to the side frames 1, by means of the bolts 6 or other suitable fastenings is a cross brace 7. The side frames 1 are of the shape more particularly shown in Fig. 1 having the forwardly extending portion 8, the upwardly extending portion 9 to which the plate or table 2 is secured, and the rearwardly extending portion 10 on the top of which is formed or secured the bottom bearing blocks 11 for the transversely extending horizontal shaft 12, the upper bearing members being shown at 13 and secured to the lower bearing members or blocks 11 by means of the bolts or other fastenings 14. Secured to the upper face of the table or plate 2 is the arm 15 of the mold section 16, and hinged to the mold section 16 by the pin 17 is the movable mold section 18 the two sections when together, as more particularly illustrated in Figs. 1 and 9, forming a complete mold unit, in the instance illustrated, having the two conical shaped openings 19 into which the batter is adapted to be discharged in a manner to be later described. Each of the mold sections 16 and 18, has inserted therein the electric heating units 20 these heating units being held in position by means of the insulating bushings or caps 21 as more particularly illustrated in Fig. 8 of the drawings. The movable mold section 18 has formed at its lower end an arm 22 to which is connected a rod 23 by means of the head 24. The head 24 carries the bumper spring 25 which engages the collar 26 formed on the end of the rod 23, said bumper spring taking up jar on the operation of the rod 23. The opposite end of the rod 23 is connected by means of the pin 27 to the bar 28 which carries on its outer end a roller 29 which engages in the cam groove 30 formed in the disc 31 which is secured to the shaft 12. Upon the rotation of the disc 31, with the shaft 12, it can be readily appreciated that as the roller 29 moves in the cam groove 30 the bar 28 and rod 23 will be operated to open and close the movable mold section.

Figure 1:
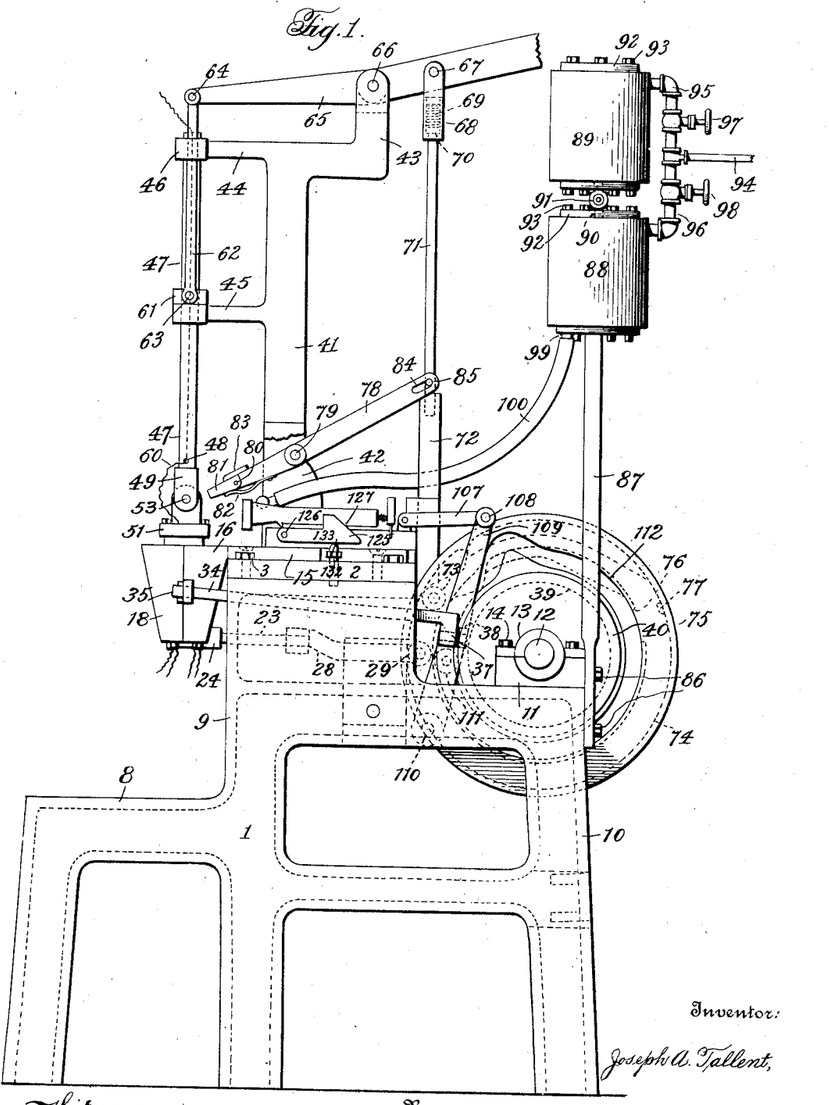
Fig. 1 is a side elevation.
Figure 3:
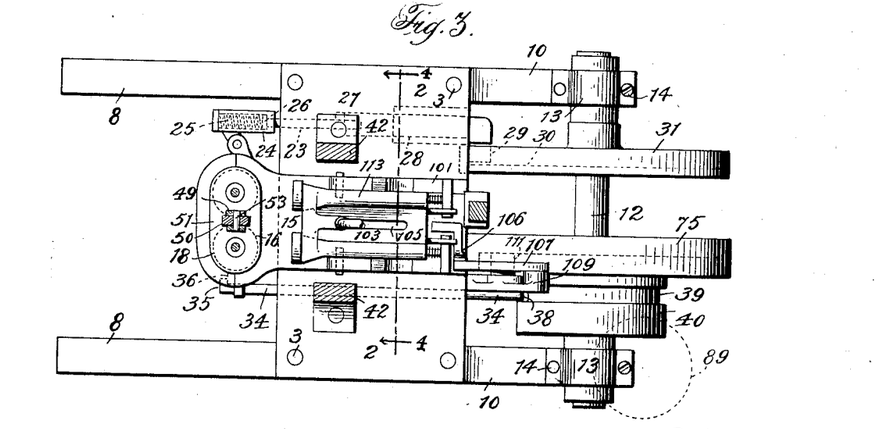
Fig. 3 is a top plan with parts shown in horizontal section.

The stationary mold section 16 is provided with the lug 32 in which there is an eye 33 through which the latch rod 34 passes as more particularly illustrated in Figs. 1 and 3 of the drawings. This latch rod has formed on its forward end a hook 35 which is adapted to engage a lug 36 formed on the movable mold section 18 to hold the sections together as shown in the drawings. The rear end of the latch rod 34 has the right angle extension 37, more particularly illustrated in Fig. 1 of the drawings, to the rear face of which is secured a roller 38 adapted to operate in the helical groove 39 formed in the periphery of the drum 40 which is secured to the shaft 12. As the drum 40 rotates with the shaft the helical groove 39 engaging the roller 38 causes the rotation of the latch rod 34 to release the hooked end 35 from the lug or projection 36. When thus released the movable section may be swung away from the stationary face of the mold in the manner which has been previously described. The helical groove engaging the wheel 38 will also cause a relatching of the sections when brought together, after the cone has been removed.

Figures 2, 5, 6:
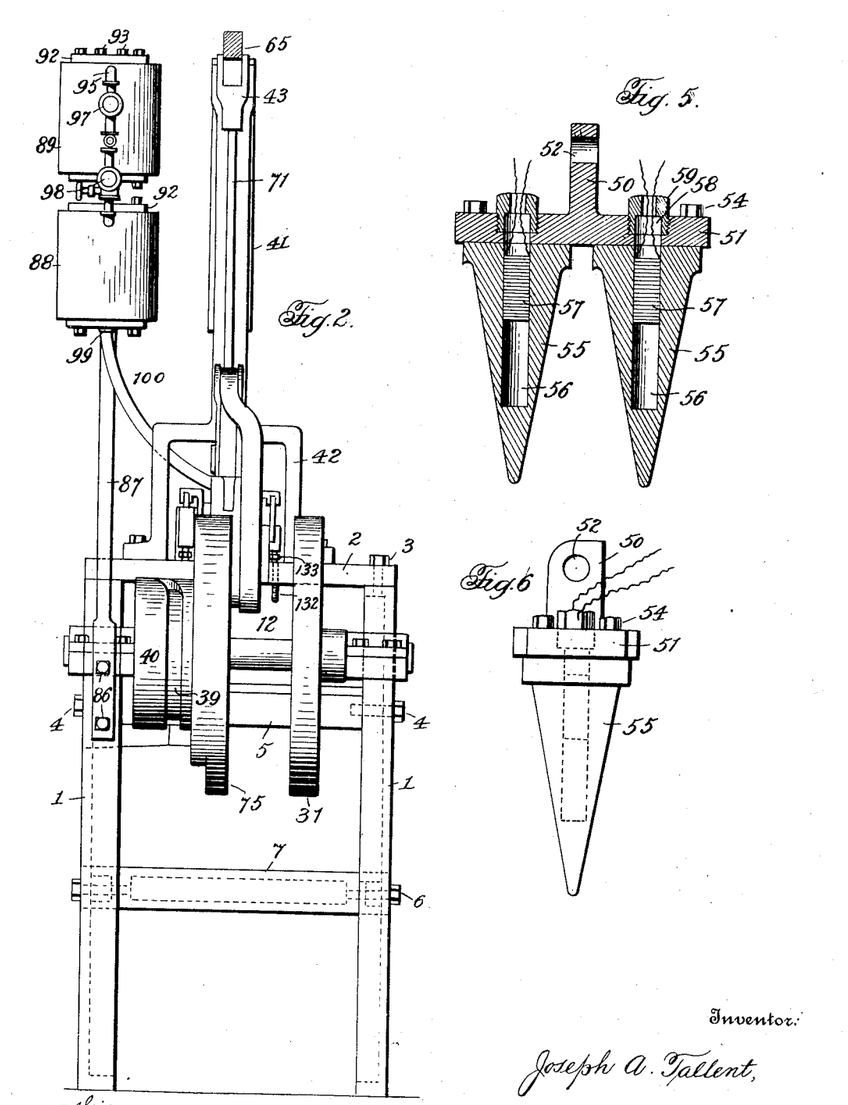
Fig. 2 is a rear elevation.
Fig. 5 is a longitudinal vertical section through one of the core units.
Fig. 6 is an end view of one of the core units.

Extending upwardly from the table or plate 2 is a standard 41, the lower end of the standard being formed with the transversely spaced legs 42 as more particularly illustrated in Figs. 2 and 3 of the drawings. Formed on the upper end of the standard 41 is the vertically extending projection 43 and formed on the forward face of the standard are the vertically spaced arms 44 and 45 the arm 44 having an opening formed in its outer end and the laterally extending perforated lugs 46 on the side faces thereof. The arm 45 has an opening at its outer end in alignment with the opening in the arm 44 and slidable through the openings in the arms 44 and 45 is the vertically extending hollow rod 47 which has the transversely extending opening 48 adjacent its lower end. Secured to the lower end of the rod 47 is the forked head 49 which receives the lug 50 formed on the upper face of the core plate 51 more particularly illustrated in Fig. 5 of the drawings. The transversely extending opening 52 is formed in the lug or projection 50 to receive the pin 53 by means of which the lug is connected to the head 49. Secured to the core plate 51 by means of the bolts 54 or other suitable fastenings are the conically shaped cores 55, two of said cores being illustrated in the drawings, one of such cores being received in each of the conical recesses 19 of the mold unit. Each of the cores 55 has a vertically extending recess 56 to receive an electric heating unit 57 the terminals of said heating unit passing through the openings 58 formed in the core plate 51, insulated bushings or caps 59, exteriorly threaded, holding the heating units within the recess 56. The current is supplied to the heating units 57 by means of the wire 60 which passes through the hollow rod 47 and out through the transversely extending opening 48. Secured to the hollow rod 47, above the arm 45, is a collar 61 to opposite faces of which are secured the vertically extending rods 62, there being one of these rods 62 on each side of the rod 47. The rods 62 are connected to the collar 61 by means of the pins or lugs 63 and the upper ends of the rods are pivotally connected at 64 to the forward end of a lever 65 which is pivotally connected intermediate its ends at 66 to the vertically extending projection 43 formed on the upper end of the standard 41.

Pivotally connected to the lever 65 at 67, is the recessed head 68 which carries the coiled spring 69 which engages the enlarged head 70 formed on the upper end of the vertically extending rod 71, the rod 71 passing through an opening formed in the bottom of the head 68 and being movable relative to the head by the tension of the spring 69. The lower end of the rod 71 is threaded into the upper end of a bar 72 which carries at its lower end a roller 73 which is adapted to operate in the cam groove 74 formed in one face of the disc 75 which is secured to the shaft 12. As the disc 75 is rotated the cam groove 74 will cause the rod 71 and bar 72 to be raised and lowered and this in turn will swing the lever 65 on its pivot 66 and cause a raising and lowering of the rods 47 to in turn raise and lower the cores 55 with respect to the mold. When the cores are initially lowered into the batter contained in the molds and the electric current is turned on for baking a certain amount of steam will be generated and in order to allow the escape of the steam it is necessary that the cores be slightly raised. To allow for this a recess 76 is formed in one face of the cam groove 74 and the projection 77 cooperates therewith to allow a momentary raising of the core upon the rotation of the disc 75 said momentarily raising being sufficient to allow for the escape of the steam. The spring 69 in the head 68 takes up the jar incidental to the lowering of the cores.

When the cores are raised it is desired that they be so positioned that the batter discharge valve, to be later described, may be positioned over the mold unit and to accomplish this I provide the lever 78 which extends through the legs 42 of the standard 41 and is pivotally connected thereto, intermediate its ends, by the pin 79. Pivotally connected to the forward end of the lever at 80 is a trip finger 81 which is held in its normally raised position by means of the leaf spring 82, the upward movement of the finger being limited by the plate 83. The finger 81 when the lever is in its position shown in Fig. 1 extends into the path of the core plate 51 and the movement of the lever is so timed that when the cores are raised the finger will engage the core plate and swing the cores upon the pivot pin 53 away from the mold unit. As the core is again lowered into position the finger may swing upon its pivot pin 80 to allow the passage of the core and plate thereby. The finger 81 will be returned to its normal position by means of the spring 82. An elongated opening 84 is formed in the lever 78, adjacent its rear end, and a pin 85 carried by the rod 71 operates in this elongated opening and causes movement of the lever 78 simultaneously with the raising and lowering of the cores.

Secured to one of the side frames 1, by means of the bolts or other suitable fastenings 86, is a standard 87 which supports the batter tanks 88 and 89, the lower end of the tank 89 being connected to the upper end of the tank 88 by means of the pipe 90 through which passage is controlled by the valve 91. Each of the tanks 88 and 89 has a plate 92 for closing the upper end thereof, the plates 92 being secured to the tanks by means of the bolts or other suitable fastenings 93. The batter is supplied to the tanks by removing the plate 92 of the tank 89 and allowing the batter to pass into the tank 88 through the valve 91 and pipe 90. The batter is adapted to be discharged from the tanks by compressed air supplied from a suitable source through the pipe 94. Connected to the pipe 94 is the branch pipe 95 leading to the upper end of the tank 89 and the branch pipe 96 leading to the upper end of the tank 88. Passage through the branch pipe 95 is controlled by the valve 97 and passage through the branch pipe 96 is controlled by the valve 98. Leading from the lower end of the tank 88 is the nipple 99 to which one end of the flexible pipe or hose 100 is connected.

Figure 10:
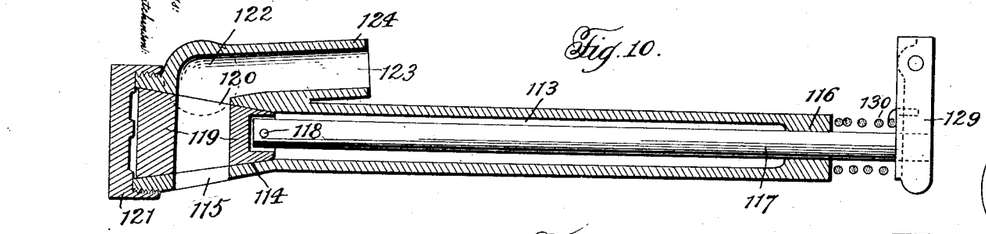
Fig. 10 is a longitudinal vertical section through the batter discharge valve with parts shown in elevation.
Figure 11:
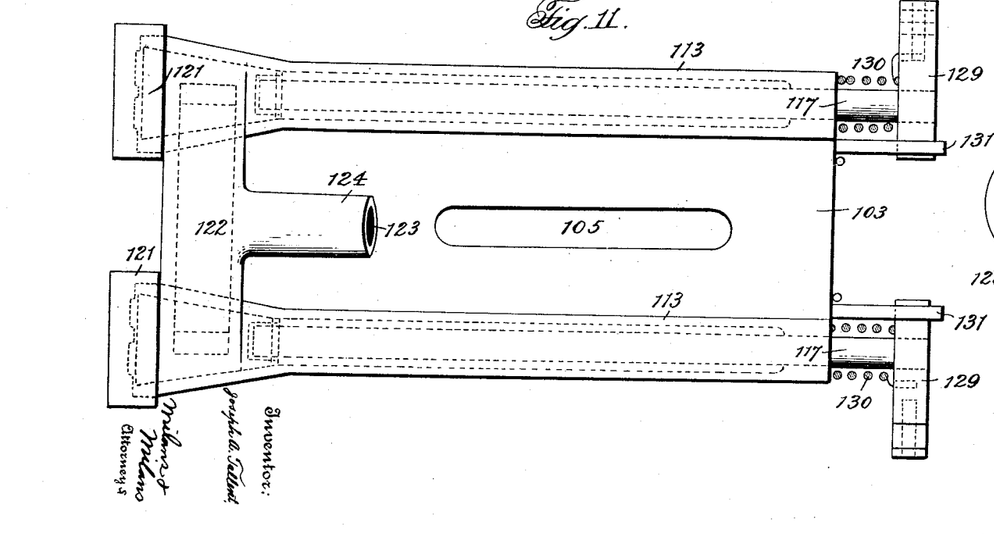
Fig. 11 is a top plan of the batter distributing valve.
Figure 12:
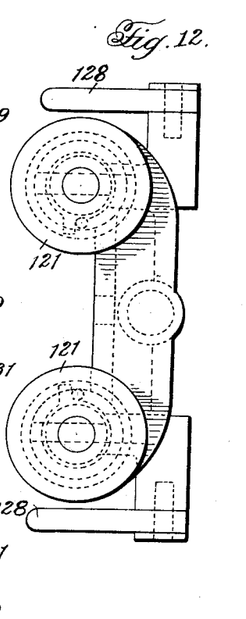
Fig. 12 is an end view of the batter distributing valve.
Figure 13:
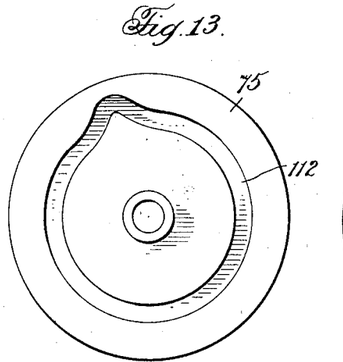
Fig. 13 is a face view of a member having a cam groove for operating the batter discharge valves.
Figure 14:
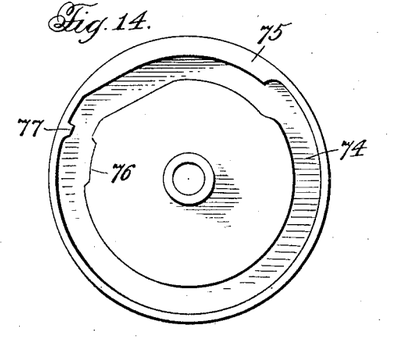
Fig. 14 shows an opposite face of the member disclosed in Fig. 13 having a cam groove for operating the core.
Figure 15:
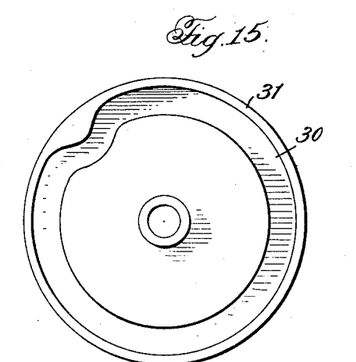
Fig. 15 is a face view of a member having a cam groove for separating the mold sections.
Figure 16:
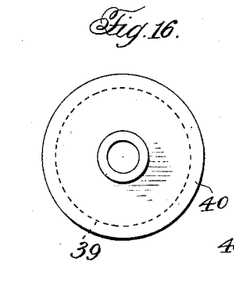
Figs. 16 and 17 show respectively side and end views of a member for operating the mold locking latch, said member, as shown in Fig. 17, having a helical groove formed therein.
Figure 17:
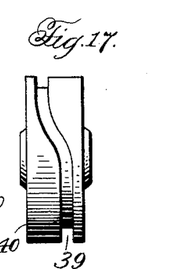

Secured to the upper face of the plate or table 2 is the channel guide member 101 in which is slidably mounted the block or casting 102 to the upper surface of which is adjustably connected the plate 103 by the bolt or screw 104, said bolt or screw operating through an elongated opening 105 formed in the plate. Secured to or formed on the block or casting 102 is a lug or projection 106 to which the forward end of a link 107 is pivotally connected. The rear end of the link 107 is pivotally connected at 108 to the upper end of an arm 109, the lower end of the arm being connected at 110 to one of the side frames 1. A roller 111 is connected to the pivoted arm 109, intermediate its ends, and this roller operates in the cam groove 112 formed in the face of the disc 75 opposite to that containing the cam groove 74. As the disc 75 is rotated it will swing the arm 109 on its pivot point 110 through means of the link 107 and cause a sliding movement of the casting 102 and the plate 103 carried thereby. This plate 103 is what may be termed the batter valve plate and adjacent each longitudinal edge has formed a passage 113 which terminates at its forward end into an enlarged tapered passage 114 from the lower end of which leads an opening 115. The rear end of the passage 113 is normally closed by the bearing 116 through which a rod 117 passes, this rod being rotatably mounted in the bearing and extending longitudinally of the recess as more particularly illustrated in Fig. 10 of the drawings. To the forward end of the rod 117 is connected by means of the pin 118 a rotatable conical valve 119 which operates in the enlarged tapered recess 114, said valve having the passage 120 therethrough. The forward end of the recess 113 is closed by the cap 121 which when removed allows for the positioning of the valve 119 in the recess 114. A recess 122 extends transversely of the plate 103 and communicates with the openings 120 in the valves 119 as well as with the passage 123 formed in the nipple 124 which extends longitudinally of the plate 103 as more particularly illustrated in Figs. 10 and 11 of the drawings. The forward end of the hose 100 is adapted to be connected to the nipple 124 and batter from the tanks 88 and 89 passes through the passage 123, the transverse passage 122, and through the openings 120 in communication with the passage 122. As the plate 103 is moved forwardly the passages 115 will be brought in position over the recesses 19 formed in the mold unit and when the valves are opened the batter will be discharged into the molds. The plate 103 may be adjusted through means of the screw or bolt 104 and the elongated openings 105 so as to properly position the openings 115 over the molds.

Figure 4:
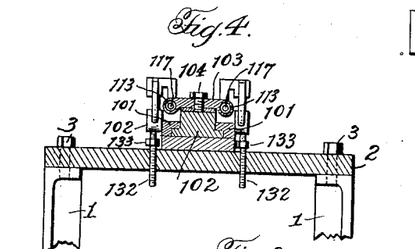
Fig. 4 is a transverse vertical section on the line 4—4 of Fig. 3 looking in the direction of the arrows.
Figure 7:
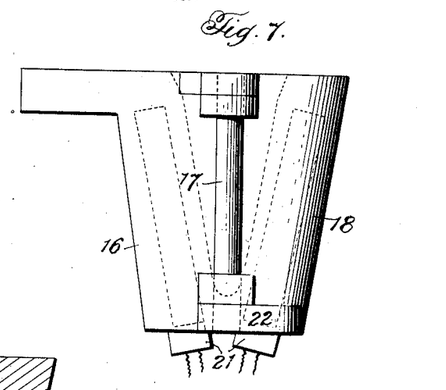
Fig. 7 is an end view of one of the mold units.

For rotating the valves I provide the arms 125 which are pivotally connected at 126 to the sides of the guides 101 said arms having the beveled ends 127 over which will ride the pivoted trips 128 carried by the outwardly extending arms 129 secured to the rear ends of the valve rods 117. As the plate 103 moves forward the trips 128 will ride up over the beveled surfaces 127 and cause the rods 117 with their associated valves 119 to rotate, the rotation of the valves bringing the openings 120 therein into registration with the transversely extending opening 122 and the openings 115 to allow the discharge of the batter into the molds. The valves are held in their normally closed position by means of the coiled springs 130 which engage the end of the plate 103 and the arms 129. The movement of the arms 129 is limited by the longitudinally extending pins 131 which are secured to the rear end of the plate 103, as shown more particularly in Fig. 11, and overlie the inner ends of the arms 129. As the plate 103 is moved rearwardly away from the molds the coiled springs 130 will cause the arms 129 to be returned to their normally horizontal position as the trips 128 pass downwardly over the beveled surfaces 127. The arms 125 may be adjusted by means of the screws 132 which carry the lock nuts 133 as more particularly illustrated in Figs. 1 and 4 of the drawings.

Having fully described the detail construction of my machine it is thought that the operation will be understood but I will endeavor to more fully point out just how the parts successively operate during the cone making operation. The discs with the cam grooves and the drum with the helical groove are so positioned and secured upon the shaft 12 and timed in their operation so as to operate the several parts of the machine in proper sequence. When the machine is started it will first be necessary to raise the cores from the mold units and this is accomplished by the operation of the roller 73 in the cam groove 74 of the disc 75. As the disc is rotated it will pull downwardly upon the bar 72 and rod 71 thereby swinging upwardly the forward end of the lever 65 which in turn through the connections raises the rod 47 and the cores from the molds. As the cores are raised the core plate 51 engaging with the finger 81 of the lever 78 the cores will be tilted outwardly at an angle so as to remove the cores from the path of the batter discharge valves so that the batter may be discharged into the molds. The lever 78 is operated through the pin connection 85 with the rods 71 so that the lever 78 will be operated in unison with the lever 65. After the cores have been raised and tilted as described the next operation is to move the batter discharge valves forwardly over the top of the molds. This is accomplished by the roller 111 engaging in the cam groove 112 of the disc 75 the upper end of the lever 109 being swung forwardly so as to move the casting 102 forwardly with the valve plate 103 which is secured thereto. When the openings 115 of the valve plate are positioned over the molds the valves 119 are rotated by the trip fingers 128 engaging the beveled surfaces 127 of the arms 125. The rotation of the valves brings the openings 120 thereof into such position that the batter from the tanks 88 and 89 will be discharged through the tube or hose 100, through the nipple 123, the transverse passage 122, the valve openings 120, and openings 115 into the mold recesses. After the predetermined amount of batter has been discharged the continued rotation of the disc 75 draws the upper end of the lever 109 rearwardly and this movement returns the valve plate and its associated casting to its original position and as the trip fingers 128 ride downwardly over the beveled surfaces 127 of the arms 125 the coiled springs 130 will return the valves to their closed positions. With the batter discharged into the molds the next step is to lower the cores into the molds and this is accomplished by the continued rotation of the disc 75 which through means of the roller 73 engaging in the groove 74 causes the outer end of the lever 65 to be lowered and allows the cores to pass into the molds. The jar of the cores engaging in the molds is taken up by the spring 69 within the head 68 connected to the rod 71. As the cores are lowered into the molds the engagement of the core plate 51 with the finger 81 lowers said finger against the action of the spring 82 so that the core plate may pass. Both the cores and the molds are heated by the electric units carried thereby and as the cores pass into the molds the batter therein is displaced and forced around between the space between the mold walls and cores. As the cones begin to bake a certain amount of steam is generated and in order to let this escape at a predetermined movement in the rotation of the cam discs the roller 73 drops into the recess 76 of the cam groove 74 and momentarily raises the cores from the mold. The steam thus escapes and the cores are then lowered to remain in the molds until such time as the cones are fully baked. After the cones have been baked the cores will again be raised in the manner previously described and in order to remove the cones from the molds it is necessary to open the mold sections. In order to open the mold sections it is first necessary to release the catch which holds them in their closed position and this is accomplished by the roller 38 engaging in the helical groove 39 of the drum 40. The catch rod 34 is rotated to release the hooked end 35 from the projection 36 on the movable mold section 18. When thus released the movable mold section is thrown into open position by means of the roller 29 engaging in the cam groove 30 of the disc 31. This causes the rod 23 to be drawn rearwardly and through means of the connection to the arm 22 formed on the mold section causes the movable mold section to be swung into open position. When thus opened the baked cone may be easily removed. Any jar caused by the opening and closing of the movable mold section is taken up by the spring in the connecting head 24. When the cone has been removed the removable mold section is closed and the hook of the latch engaged by the continued rotation of their respective operating discs and before the cores are again lowered into the molds batter will be discharged into the molds for continued operation. The batter is introduced into the tanks 88 and 89 by the removal of the top plates 92 and the batter will be discharged from the tanks or receptacles by the compressed air conveyed through the pipe 94 and the branches 95 and 96. Passage of batter from the tank 89 into the tank 88 is controlled by the valve 91 and the discharge of the compressed air through the branches 95 and 96 is controlled by means of the valves 97 and 98. The valve plate is adjustable upon the casting 102 through means of the screw or bolt 104 and the elongated slot 105. It will be appreciated that at times it may be necessary to adjust the valve plate upon the casting so as to properly position the valve openings over the molds for the discharge of the batter. At the same time the trip arms 125 may be adjusted through means of the screws 132 this allowing for the rotation of the batter valves at the proper time.

It will be understood that the cam and helical grooves are so formed in their respective discs and drum and the operation of the discs is so timed by the manner in which they are secured upon the shaft 12 so as to time the operation of the several elements and to allow them to operate in proper sequence. I have provided a machine of relatively simple construction in which the cones may be easily and cheaply baked, requiring a minimum amount of labor. While I have shown the mold and cores as being adapted for baking two cones at a time it will be understood that, if desired, only one mold opening and core could be provided or a greater number than two provided. In other words a core plate could be secured to the operating rod provided with any number of cores and a mold unit having any number of conical openings might be secured to the table or plate 2 of the machine.

Having fully described my invention what I claim as new and desire to secure by Letters Patent is:

1. A machine of the character described comprising a mold, a core adapted to be received in the mold, a slidable support, a plate carried by the support and adjustable thereon, said plate having a passage therein for the discharge of batter, a valve for controlling the discharge through the passage, and means for operating the support for positioning the passage in the plate over the mold.

2. A machine of the character described comprising a mold, a core adapted to be received in the mold, a plate slidable relative to the mold and having a passage therein for the discharge of batter, a valve for controlling the passage, means for moving the core relative to the mold, a member pivotally connected adjacent the plate and having a beveled surface, means engageable with the beveled surface for operating the valve, and means for operating the plate to position the passage therein over the mold.

3. A machine of the character described comprising a mold, a core adapted to be received in the mold, means for operating the core, a guideway, a plate movable in the guideway relative to the mold and having a passage therein for the discharge of batter, a valve for controlling the passage, a member having a beveled surface connected to the guideway and extending upwardly therefrom, means connected with the valve and engageable with the beveled surface during the movement of the plate for operating the valve and means for operating the plate to position the passage therein over the mold.

4. A machine of the character described comprising a mold, a core adapted to be received within the mold, means for raising and lowering the core relative to the mold, a yieldable trip finger extending into the path of the core for tilting the same as it is raised, means for feeding batter to the mold, and means for baking a cone in the mold.

5. A machine of the character described comprising a mold, a core adapted to be received in the mold, means for raising and lowering the core relative to the mold, a spring controlled trip finger extending into the path of the core for tilting the same as it is raised and yielding as the core is lowered, means for feeding batter to the mold, and means for baking a cone in the mold.

6. A machine of the character described comprising a support, a mold carried by the support, a core adapted to be received in the mold, means for raising and lowering the core relative to the mold, a lever pivotally connected to the support, a trip finger carried by the lever and extending into the path of the core for tilting the same as it is raised, means for operating the lever, means for feeding batter to the mold, and means for baking a cone in the mold.

7. A machine of the character described comprising a mold, a core adapted to be received in the mold, means for raising and lowering the core relative to the mold, a pivoted trip finger extending into the path of the core, said trip finger engaging the core on the upward movement thereof for tilting the same but yielding on the downward movement of the core, means for feeding batter to the mold, and means for baking a cone in the mold.

8. A machine of the character described comprising a support, a mold carried by the support, a block slidably mounted upon the support, a plate adjustably connected to the block and having passages therethrough, valves controlling said passages, means for operating the block so as to position the valves over the mold, means for feeding batter to the passages for discharge through the valves into the mold, a core adapted to be received in the mold, and means for baking a cone in the mold.

9. A machine of the character described comprising a support, a mold carried by the support, a block slidably mounted on the support, a plate adjustably connected to the block and having a passage therein, a rotatable valve for controlling said passage, means for operating the block to position the valve over the mold, means for feeding batter to the passage for discharge through the valve into the mold, means for rotating the valve, a core adapted to be received in the mold, and means for baking a cone in the mold.

10. A machine of the character described comprising a support, a mold carried by the support, a core adapted to be received in the mold, a lever pivotally connected to the support, a trip finger carried by the lever and extending into the path of the core for tilting the same, and common means for raising and lowering the core relative to the mold and for operating the pivoted lever.

11. A machine of the character described comprising a support, a mold carried by the support, a lever pivotally connected to the support, a core suspended from the lever and adapted to be raised and lowered relative to the mold upon operation of the lever, a second lever pivotally connected to the support, a trip finger carried by the second mentioned lever and extending into the path of the core for tilting the same as it is raised, and common means for operating the two levers.

12. A machine of the character described comprising a mold, a core adapted to be received in the mold, a plate slidable relative to the mold and having a passage therein for the discharge of batter, a valve for controlling the passage, means for moving the core relative to the mold, a beveled surface formed adjacent the plate, means for adjusting the beveled surface, means engageable with the beveled surface for operating the valve, and means for operating the plate to position the passage therein over the mold.

13. A machine of the character described comprising a mold, a core adapted to be received in the mold, a plate slidable relative to the mold and having a passage therein for the discharge of batter, a valve for controlling the passage, means for moving the core relative to the mold, a beveled surface formed adjacent the plate, an adjustable screw for raising and lowering the beveled surface, means engageable with the beveled surface for operating the valve, and means for operating the plate to position the passage therein over the mold.

14. A machine of the character described including a support, a sectional mold carried by the support, a latch rod for locking the sections of the mold, a slidable rod connected at one end to one of the mold sections and adapted for moving the same relative to the other section, a second slidable rod, a core secured to said second mentioned rod, a valve for supplying batter to the mold, a link for operating the valve, and means carried upon a single shaft for operating the latch rod to release the mold sections, to operate the first mentioned rod to move one of the mold sections relative to the other, to operate the valve through means of the link connected thereto, and to operate the second mentioned rod for raising and lowering the core.

15. A machine of the character described including a support, a mold carried by the support, a core adapted to be received in the mold, means for raising and lowering the core relative to the mold, and means for discharging batter into the mold, said means including a slidable plate having a longitudinally extending passage therein, said passage terminating at one end in a tapered enlargement, a rotatable valve received in the tapered enlargement, a valve rod secured to said valve and extending through the longitudinally extending passage, a spring for normally holding the valve into tight engagement with the tapered enlargement and to normally hold the valve in closed position, and means for feeding batter to be discharged through said valve.

In testimony whereof I hereunto affix my signature.

JOSEPH ANDREW TALLENT.